(12) United States Patent
Watanabe et al.

(10) Patent No.: US 9,045,879 B2
(45) Date of Patent: Jun. 2, 2015

(54) CONSTRUCTION MACHINE

(75) Inventors: Kouichi Watanabe, Hiratsuka (JP); Takao Nagano, Kawasaki (JP)

(73) Assignee: KOMATSU LTD., Tokyo (JP)

( * ) Notice: Subject to any disclaimer, the term of this patent is extended or adjusted under 35 U.S.C. 154(b) by 187 days.

(21) Appl. No.: 13/814,362

(22) PCT Filed: Mar. 26, 2012

(86) PCT No.: PCT/JP2012/057751
§ 371 (c)(1),
(2), (4) Date: Feb. 5, 2013

(87) PCT Pub. No.: WO2012/133307
PCT Pub. Date: Oct. 4, 2012

(65) Prior Publication Data
US 2013/0133962 A1    May 30, 2013

(30) Foreign Application Priority Data
Mar. 31, 2011   (JP) .................. 2011-077601

(51) Int. Cl.
*B62D 25/20* (2006.01)
*E02F 9/22* (2006.01)
*E02F 9/26* (2006.01)
*F01M 1/18* (2006.01)
*H02K 9/19* (2006.01)
*G01F 23/04* (2006.01)
*E02F 9/08* (2006.01)
(Continued)

(52) U.S. Cl.
CPC ... *E02F 9/22* (2013.01); *E02F 9/26* (2013.01); *F01M 1/18* (2013.01); *F01M 11/0004* (2013.01); *F01M 11/12* (2013.01); *H02K 9/19* (2013.01); *G01F 23/04* (2013.01); *E02F 9/0866* (2013.01); *E02F 9/0891* (2013.01); *H02K 7/14* (2013.01)

(58) Field of Classification Search
USPC .............. 180/65.26, 65.21, 65.22, 54.1, 69.1, 180/291, 69.6; 33/722, 730; 184/1.5, 106; 310/273
See application file for complete search history.

(56) References Cited

U.S. PATENT DOCUMENTS 3,735,494 A * 5/1973 Gumtow .......................... 33/726
4,085,815 A * 4/1978 Miller ........................... 180/54.1
(Continued)

FOREIGN PATENT DOCUMENTS

JP        6-80807 U     11/1994
JP     2003-235208 A    8/2003
(Continued)

OTHER PUBLICATIONS

International Search Report of Corresponding PCT Application No. PCT/JP2012/057751.

Primary Examiner — J. Allen Shriver, II
Assistant Examiner — James M Dolak
(74) Attorney, Agent, or Firm — Global IP Counselors, LLP

(57) ABSTRACT

A construction machine includes an engine, a hydraulic pump driven by drive force of the engine, a generator motor, and a dipstick tube. The generator motor is disposed between the engine and the hydraulic pump. The generator motor has a rotary shaft connected to an input shaft of the hydraulic pump and to an output shaft of the engine and an oil pan disposed in a lower part of a holding space formed inside a housing. The dipstick tube has a connector provided at a location that communicates with the oil pan of the generator motor, and a dipstick opening disposed above the generator motor, for checking a level of oil in the oil pan.

7 Claims, 7 Drawing Sheets

(51) Int. Cl.
*F01M 11/00* (2006.01)
*F01M 11/12* (2006.01)
*H02K 7/14* (2006.01)

(56) References Cited

U.S. PATENT DOCUMENTS

| | | | | |
|---|---|---|---|---|
| 4,512,293 A | * | 4/1985 | Mast et al. | 123/65 B |
| 5,022,495 A | * | 6/1991 | Lavender | 184/105.1 |
| 6,688,600 B2 | * | 2/2004 | Kawada et al. | 277/321 |
| 6,833,641 B2 | * | 12/2004 | Uchida et al. | 310/54 |
| 6,981,574 B1 | * | 1/2006 | Bedi | 184/1.5 |
| 7,100,744 B2 | * | 9/2006 | Kettle et al. | 184/92 |
| 7,193,333 B1 | * | 3/2007 | Kitch | 290/1 A |
| 7,347,169 B2 | * | 3/2008 | Nagahashi et al. | 123/41.35 |
| 8,037,963 B2 | * | 10/2011 | Nishimura et al. | 180/291 |
| 8,439,008 B2 | * | 5/2013 | Kauer et al. | 123/196 R |
| 8,820,290 B2 | * | 9/2014 | Sotani | 123/196 R |
| 8,931,585 B2 | * | 1/2015 | Sakai et al. | 180/291 |
| 2008/0264918 A1 | * | 10/2008 | Helf et al. | 219/133 |
| 2009/0199553 A1 | | 8/2009 | Nishimura et al. | |

FOREIGN PATENT DOCUMENTS

| | | |
|---|---|---|
| JP | 2007-006554 A | 1/2007 |
| JP | 2009-185677 A | 8/2009 |
| WO | 2008/015798 A1 | 2/2008 |

* cited by examiner

CONSTRUCTION MACHINE

CROSS-REFERENCE TO RELATED APPLICATIONS

This application claims priority to Japanese Patent Application No. 2011-077601 filed on Mar. 31, 2011, the disclosure of which is hereby incorporated herein by reference in its entirety.

BACKGROUND OF THE INVENTION

1. Technical Field

The present invention relates to a hybrid construction machine in which an engine, a hydraulic pump, and a generator motor are installed.

2. Description of the Related Art

So-called hybrid construction machines, in which a generator motor is installed between the engine and a hydraulic pump, have been under development in recent years.

The generator motor installed in a hybrid construction machine is connected to the output shaft of the engine and the input shaft of the hydraulic pump, and generates power from the drive force of the engine. The electrical energy generated by the generator motor is stored in a capacitor or other such electrical storage device, and when the construction machine requires a high engine output, for example, the generator motor is driven by the stored electrical energy and boosts the output of the engine.

For example, Japanese Laid-Open Patent Application 2007-6554 (laid open Jan. 11, 2007) discloses a generator motor configuration in which the housing has an oil pan for holding cooling oil, and oil is uniformly sprayed onto a plurality of coils, which affords efficient cooling.

Japanese Laid-Open Patent Application 2003-235208 (laid open Aug. 22, 2003) discloses a configuration of a generator motor incorporated between an engine and a hydraulic pump.

SUMMARY

However, the following problems were encountered with the above-mentioned conventional construction machine.

With the generator motors disclosed in Japanese Laid-Open Patent Application 2007-6554, a dipstick tube that communicates with the oil pan is provided in order to check the level of the oil in the oil pan provided inside the housing. With a configuration in which this generator motor is disposed between an engine and a hydraulic pump as in Japanese Laid-Open Patent Application 2003-235208, the dipstick opening of the dipstick tube of the generator motor is provided on the hood side above the hydraulic pump so that the generator motor can be checked from the hood provided on a vehicle side face in a state in which the inspector is on the ground.

With this configuration, however, during vehicle maintenance, etc., the engine is checked by opening the engine hood provided to the upper face of the body, while the generator motor is checked by opening a hood on the body side face, and this makes the work more difficult during maintenance.

Furthermore, when the dipstick opening is provided to the hydraulic pump via an attachment seat or the like, when the hydraulic pump is removed, the dipstick tube has to be taken off after draining all the oil from the oil pan, and this ends up making the job much more difficult.

More specifically, when viewed from the hood side on the body side face, the hydraulic pump has an opening diameter of a circular member covering a flange of the generator motor on a face on the generator motor side. On the other hand, the hood side of the hydraulic pump has a cross sectional area proportional to the main body of the hydraulic pump. Therefore, the cross sectional area of the hydraulic pump gradually decreases moving closer to the hood side. When the dipstick tube is disposed under such conditions, since the dipstick tube is provided to conform to the shape of the hydraulic pump, it is disposed at an angle so as to approach the rotary shaft of the hydraulic pump moving closer to the hood side. In a situation such as this, when the hydraulic pump is removed with a hoist or the like, if an attempt is made to remove the hydraulic pump by removing just the dipstick opening, the circular member of the hydraulic pump covering the flange on the generator motor side will interfere with the dipstick opening, and may damage the dipstick tube. Thus, when the hydraulic pump is removed, the dipstick tube must be taken off after first draining out the oil held in the oil pan, which takes a lot of extra time.

It is an object of the present invention to provide a construction machine in which a generator motor is installed between the engine and a hydraulic pump, wherein the work entailed during maintenance is easier.

The construction machine pertaining to the first aspect comprises an engine, a hydraulic pump, a generator motor, and a dipstick tube. The generator motor is provided between the engine and the hydraulic pump and has a rotary shaft connected to the input shaft of the hydraulic pump and to the output shaft of the engine, and an oil pan provided to the lower part of a holding space formed inside a housing. The dipstick tube has a connector provided at a location that communicates with the oil pan of the generator motor, and a dipstick opening disposed above the generator motor, for checking the level of oil in the oil pan.

Here, with a so-called hybrid construction machine in which a generator motor is disposed between the engine and a hydraulic pump, the dipstick opening of the dipstick tube used to check the level of oil in the oil pan provided inside the housing of the generator motor is provided above the generator motor.

During vehicle inspection of a hybrid construction machine, it is usually necessary to inspect the engine, the hydraulic pump, and the generator motor.

With the construction machine of this aspect, the dipstick opening is provided above the generator motor so that the generator motor can be inspected from the top of the vehicle by opening the engine hood, just as with the engine and other such inspected components.

Consequently, during inspection of the generator motor, just as during inspection of the engine, the oil can be checked by opening the openable engine hood provided to the vehicle upper face of the construction machine. As a result, maintenance work on a hybrid construction machine can be carried out more easily than in the past.

The construction machine pertaining to the second aspect is the construction machine pertaining to the first aspect, further comprising an engine hood that can be opened and closed and covers the upper space in an engine compartment that houses the engine, the hydraulic pump, and the generator motor. The dipstick opening of the dipstick tube is provided in a space that is exposed when the engine hood is opened.

Consequently, when the engine hood is opened to check the oil level in the engine, the oil level in the generator motor can be checked at the same time. As a result, the work is easier during inspection.

The construction machine pertaining to the third aspect is the construction machine pertaining to the first or second aspect, further comprising an engine dipstick tube for checking the oil level of the engine. The dipstick opening of the dipstick tube is provided on the same side as the dipstick opening of the engine dipstick tube.

Consequently, when the oil level of the engine is checked, the oil level of the generator motor can be checked at the same time. As a result, the work is easier during inspection.

The construction machine pertaining to the fourth aspect is the construction machine pertaining to any of the first to third aspects, wherein the housing is made up of a first housing fixed on the engine side, and a second housing fixed on the hydraulic pump side. The connector is provided to the first housing.

Here, the connector of the dipstick tube of the generator motor disposed between the engine and the hydraulic pump is provided on the side of the first housing fixed on the engine side.

Consequently, if the hydraulic pump should need to be removed during maintenance work, etc., there is no need to perform the bothersome job of draining the oil held in the oil pan in order to remove the dipstick tube fixed on the hydraulic pump side. Furthermore, even if the second housing on the hydraulic pump side is removed after the hydraulic pump has been removed during disassembly of the generator motor, there is no need to remove the dipstick tube.

As a result, the work entailed by maintenance around the generator motor and the hydraulic pump will be easier than in the past.

The construction machine pertaining to the fifth aspect is the construction machine pertaining to any of the first to fourth aspects, wherein the dipstick tube can also be used as an oil filler pipe for adding oil to the generator motor.

Here, the above-mentioned dipstick tube is used not only to check the level of oil held in the oil pan, but also as an oil filler pipe to add oil to the oil pan.

Consequently, if it is found that the oil level is below the specified level when using the dipstick tube to check the level of oil held in the oil pan, the oil pan can be topped up through this oil filler pipe. As a result, fewer parts are needed and the configuration is simpler than with a conventional configuration in which the dipstick tube and the oil filler pipe are provided separately to the generator motor, so the space inside the engine compartment can be utilized more efficiently.

The construction machine pertaining to the sixth aspect is the construction machine pertaining to any of the first to fifth aspects, wherein the dipstick tube has a bent section that is bent so as to go around a muffler mounted on the engine.

Here, a bent section for going around the muffler mounted on the engine is provided to a part of the dipstick tube.

Since the generator motor here is disposed adjacent to the engine, the muffler, which is installed on the engine and generates a large quantity of heat, will sometimes be disposed directly over the generator motor.

In view of this, with this aspect, a bent section is provided so that the heat from the muffler will not adversely affect the dipstick tube.

Consequently, the heat from the muffler can be prevented from reaching the dipstick tube, and the dipstick tube can be routed to the side where the muffler is not disposed and where there is plenty of space.

The construction machine pertaining to the seventh aspect is the construction machine pertaining to any of the first to sixth aspects, wherein said construction machine is a hydraulic excavator.

DESCRIPTION OF THE EMBODIMENTS

A hybrid hydraulic excavator (construction machine) 51 pertaining to an embodiment of the present invention will be described through reference to FIGS. 1 to 7.

Hydraulic Excavator 51

Figure 1:
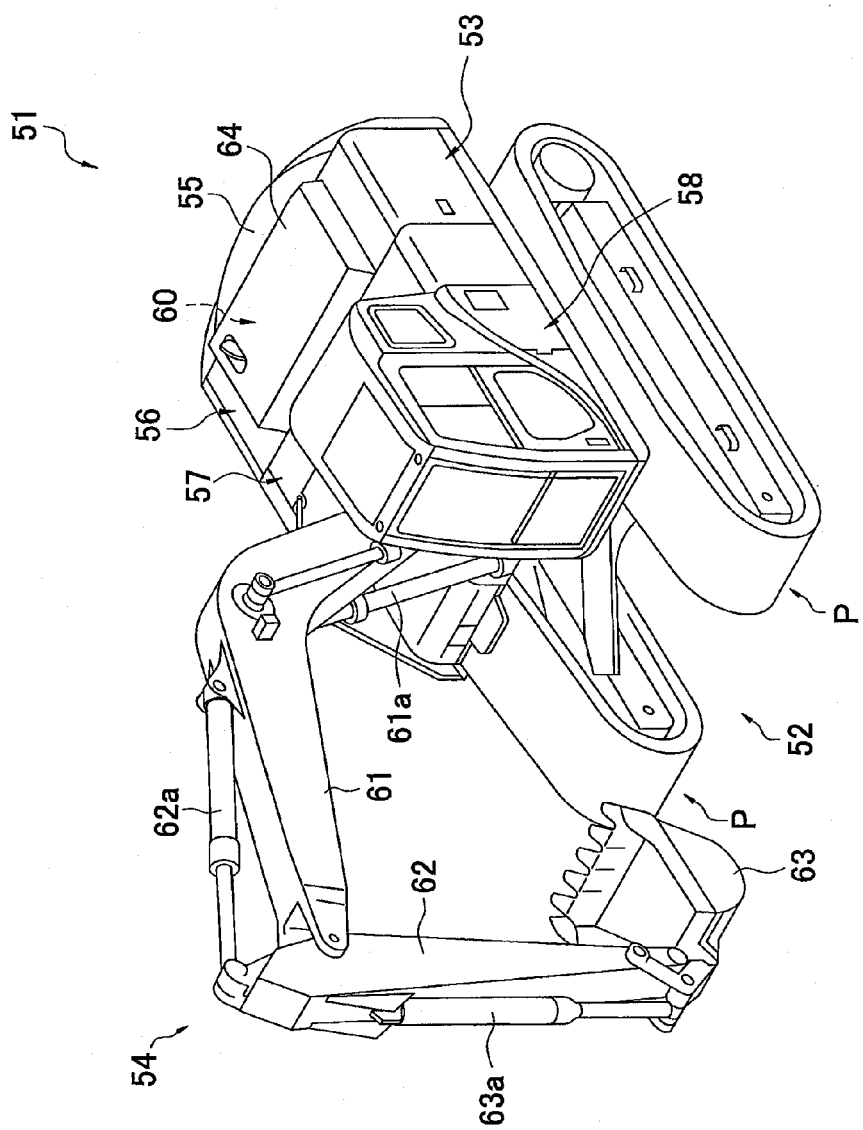
FIG. 1 is an overall oblique view of the configuration of the hydraulic excavator pertaining to an embodiment of the present invention.

As shown in FIG. 1, the hybrid hydraulic excavator 51 pertaining to this embodiment comprises a lower traveling unit 52, a work implement 54, a counterweight 55, a machinery bay 56, a body 57, and a cab 58. The hydraulic excavator 51 is equipped with an engine 2 as a drive source. A generator motor 1 and a hydraulic pump 4 are serially connected to the output shaft of the engine 2 and are driven by the engine 2.

The lower traveling unit 52 moves the hydraulic excavator 51 forward and backward by rotating crawler belts P wound around the left and right end portions in the forward direction. A revolving base 53 is installed on the upper face of the lower traveling unit 52.

The revolving base 53 is able to revolve in any direction with respect to the lower traveling unit 52. The work implement 54, the counterweight 55, the machinery bay 56, the body 57, and the cab 58 are installed on the upper face of the revolving base 53. The revolving base 53 is rotated by an electric swing motor driven by power supplied from the generator motor 1 or an electrical storage device. The electric swing motor generates power by regeneration during deceleration of the revolving base, and the electrical energy thus generated is stored in a capacitor.

The work implement 54 is configured to include a boom 61, an arm 62 attached to the distal end of the boom 61, and a bucket 63 attached to the distal end of the arm 62. The work implement 54 performs excavation work in dirt, gravel, or the like at a construction site while moving the boom 61, the arm 62, the bucket 63, etc., up and down with hydraulic cylinders 61a, 62a, 63a, etc., included in a hydraulic circuit (not shown).

The counterweight 55 consists, for example, of a box made of sheet metal and filled with scrap iron, concrete, or the like, and is provided to the rear of the revolving base 53 to balance the body during digging or the like.

As shown in FIG. 1, the machinery bay 56 is disposed adjacent to the counterweight 55, and has an engine compartment 60 that internally holds the engine 2, the generator motor 1, the hydraulic pump 4, etc. (see FIG. 2). The engine compartment 60 has an upper opening 60a used for inspection and covered by an engine hood 64 that can be opened and closed (see FIG. 7). The configuration around the generator motor 1 installed in the engine compartment 60 will be discussed in detail below. The machinery bay 56 is a space enclosed by a hydraulic fluid tank (not shown), a firewall provided between the engine compartment 60 and the cab 58, openable covers provided on the side faces at the left and right ends of the vehicle, the counterweight 55, the engine hood 64, and so forth. The engine 2, the generator motor 1, and the hydraulic pump 4 are aligned along the counterweight 55 inside the machinery bay 56.

The body 57 is disposed to the rear of the work implement 54, and houses a fuel tank, hydraulic fluid tank, operating valves, and so forth (not shown).

The cab 58 has an interior space in which the operator of the hydraulic excavator 51 rides, and is disposed at the left-front part to the side of the work implement 54 on the revolving base 53 so that the operator can see the end of the work implement 54.

Generator Motor 1

Figure 2:
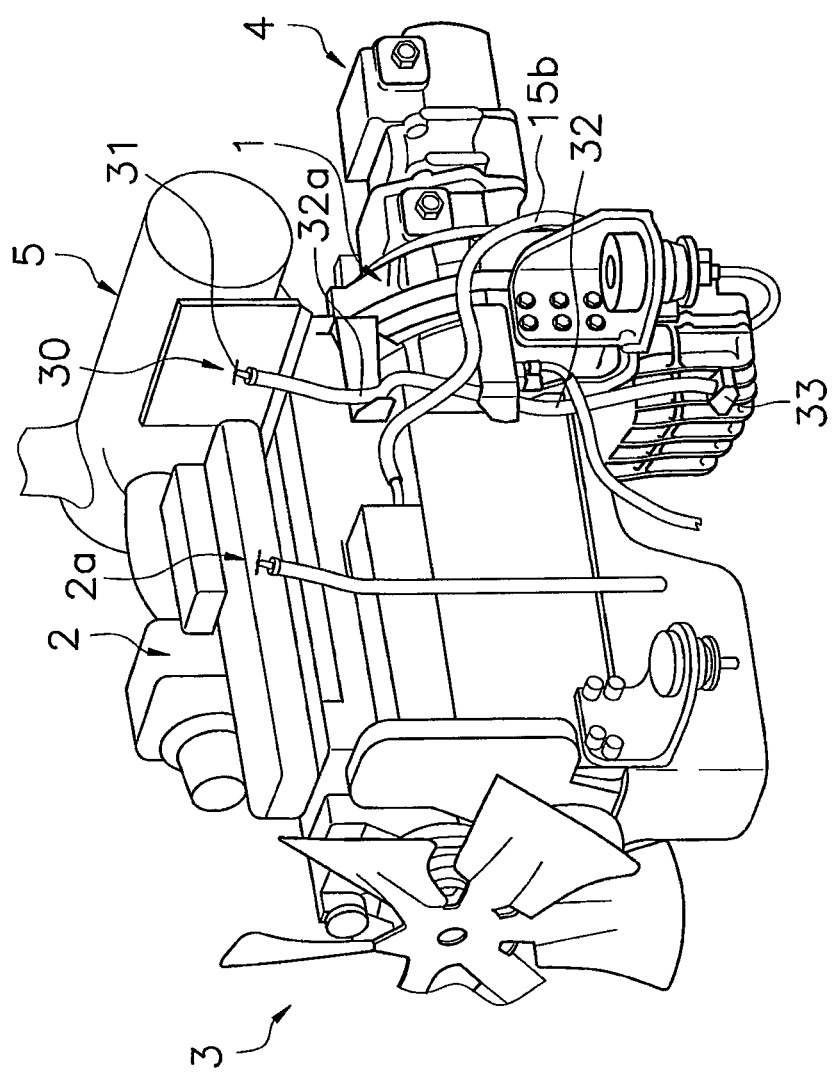
FIG. 2 is an oblique view of the configuration of the engine, generator motor, and hydraulic pump installed in the hydraulic excavator in FIG. 1.

As shown in FIG. 2, the generator motor 1 in this embodiment is installed in the hybrid hydraulic excavator 51, which comprises the engine 2, a cooling fan 3, the hydraulic pump 4, a muffler 5, and so on. The generator motor 1 is disposed between the engine 2 and the hydraulic pump 4. The generator motor 1 is also designed so that a rotary shaft 19 (see FIG. 3) is directly or indirectly connected to the output shaft of the engine 2 and the input shaft of the hydraulic pump 4, and generates power from the rotational drive force of the output shaft of the engine 2. The generator motor 1 is connected to a capacitor via an inverter. When the speed of the engine 2 is increasing (the hydraulic excavator is accelerating), for example, the generator motor 1 is used as needed as an electric motor by means of the electrical energy stored in the capacitor, and assists the rotation of the engine 2. When the engine 2 is idling, the generator motor 1 generates power under the rotational drive force of the engine 2, and the electrical energy thus generated is stored in the capacitor. In this embodiment, the engine 2, the generator motor 1, and the hydraulic pump 4 are disposed in series, and the rotational axes thereof are disposed in a straight line.

Figure 3:
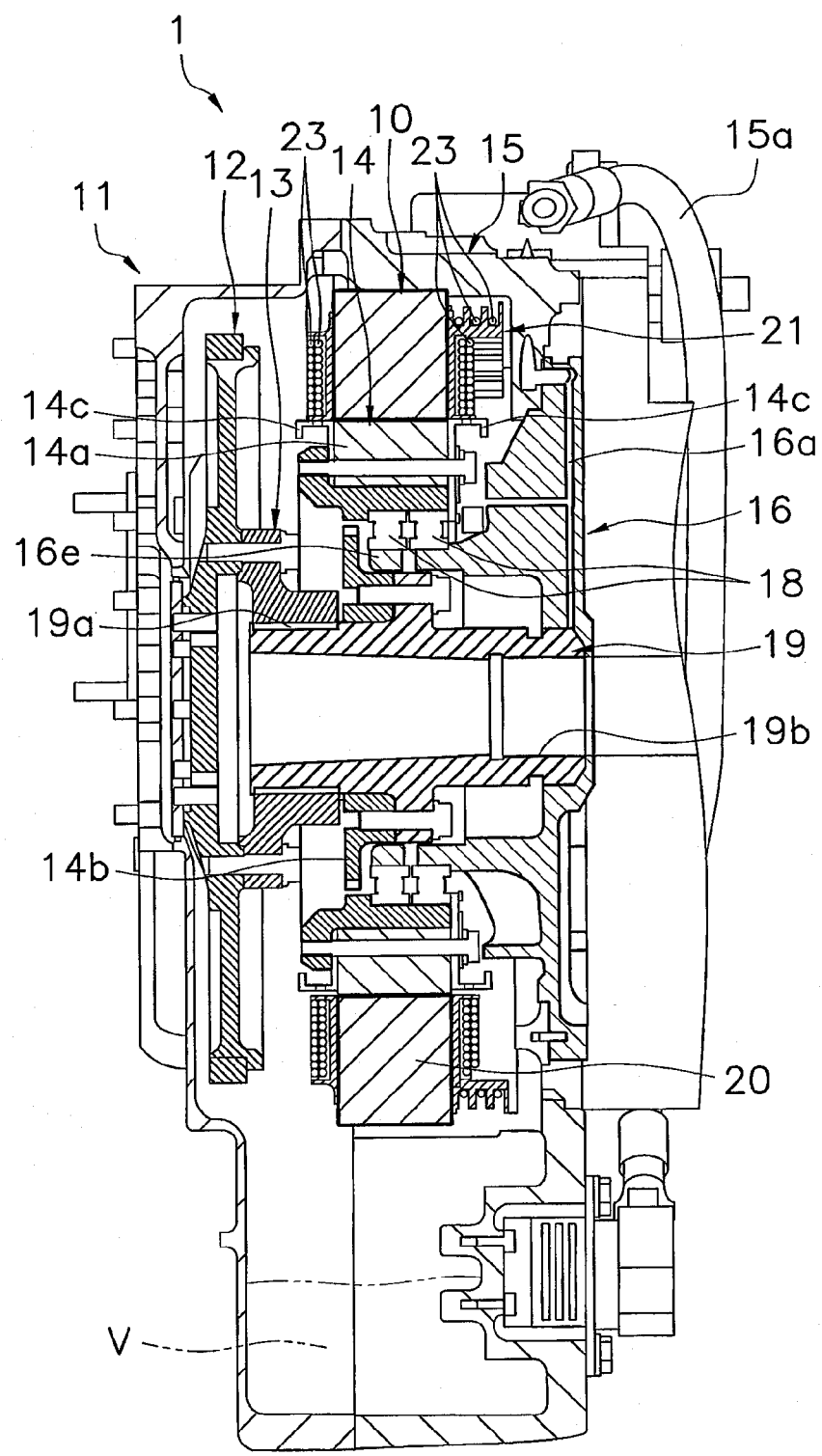
FIG. 3 is a cross section of the configuration of the generator motor included in FIG. 2.
Figure 4:
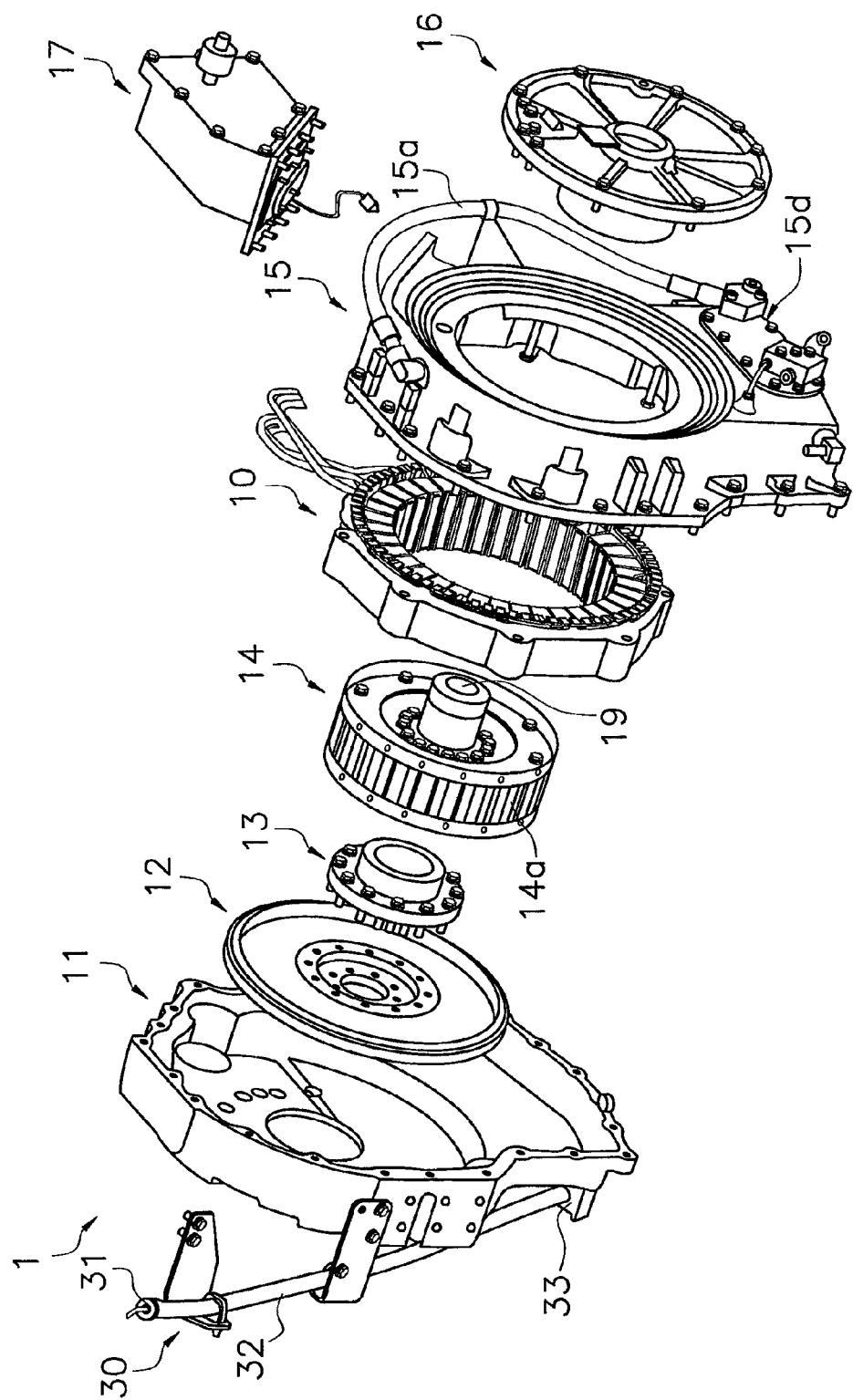
FIG. 4 is an exploded oblique view of the configuration of the generator motor included in FIG. 2.

The generator motor 1 is a 3-phase, 12-pole SR (switched reluctance) motor, and has an oil pan V in its lower part. As shown in FIGS. 3 and 4, the generator motor 1 comprises a stator 10, a first housing 11, a flywheel 12, a coupling 13, a rotor 14, a second housing 15, a flange 16, and the rotary shaft 19.

As shown in FIG. 3, the stator 10 is provided inside a holding space formed within the first and second housings 11 and 15, which make up the outer profile of the generator motor 1. The stator 10 is made up of a circular stator core 20, an insulator 21, coils 23, and so forth.

The stator core 20 is produced by stacking a plurality of steel plates that include a circular yoke portion and stator teeth portions that are disposed along the peripheral direction and protrude at an equal angular spacing inward in the radial direction from the yoke part. In this embodiment, a stator core 20 that includes a total of 36 protrusions is used to configure a 3-phase, 12-pole SR motor.

After the insulator 21 has been mounted to each of the protrusions, the coils 23 are wound.

The first housing 11 is made of cast iron, and as shown in FIG. 3, it is joined with the second housing 15 to form a space that internally holds the stator 10, the rotor 14, and so on. The oil pan V that holds cooling oil for cooling the heat-generating parts of the stator 10 (such as the coils 23) and for lubricating the rotary shaft 19 and a bearing 18 is formed in the lower part of this holding space. Also, as shown in FIG. 4, a dipstick tube 30 (also serves as an oil filler pipe) that is used to check the level of oil in the oil pan V and to refill the oil pan V is connected to the lower end of the first housing 11. The configuration of this dipstick tube 30 will be discussed in detail below.

The cooling oil held in the oil pan V inside the first and second housings 11 and 15 is circulated by a circulation pump (not shown), and is cooled by going through a cooling device (such as an oil cooler 15d (see FIG. 4)) provided to the lower part of the second housing 15, and then goes back into the space inside the first and second housings 11 and 15.

The flywheel 12 is provided on the engine 2 output shaft side within the first and second housings 11 and 15, is connected via the coupling 13 to the rotor 14, and rotates inside the first and second housings 11 and 15.

As shown in FIG. 4, the coupling 13 is a substantially circular member, and is bolted to the flywheel 12. As shown in FIG. 3, the coupling 13 is such that splines formed on the inner radial side mesh with external splines 19a formed on the outer radial side of the rotary shaft 19. Consequently, the flywheel 12 and the coupling 13 rotate along with the rotor 14 around the rotary shaft 19.

As shown in FIG. 3, the rotor 14 is a member on the rotating side, which rotates around the rotary shaft 19, and is inserted into a space on the inner peripheral side of the circular stator 10 in the holding space inside the first and second housings 11 and 15. The rotor 14 has a holder 14b to which a rotor yoke 14a is attached on the outer peripheral side.

The rotor yoke 14a is a structure consisting of a plurality of laminated steel plates (magnetic steel plates), and as shown in FIG. 3, is bolted to the outer peripheral face side of the holder 14b, and has a plurality of inductors (not shown) provided at an equal angular spacing in the peripheral direction on the outer peripheral face side of a circular main body. The rotor yoke 14a is supported so as to be sandwiched by aluminum blades 14c provided on the engine 2 side and the hydraulic pump 4 side. Through-holes that open outward in the radial direction are formed in the outer peripheral faces of the blades 14c. When the rotor 14 rotates, cooling oil is sprayed through these through-holes onto the coils 23 disposed on the outside in the radial direction. These blades 14c need not be provided if the rotor yoke 14a can be supported by recesses formed in the holder 14b, for example.

As shown in FIG. 3, the holder 14b is bolted to the outer peripheral portion of the rotary shaft 19 in a state in which the rotary shaft 19 has been inserted into a center hole. Also, the holder 14b is a steel member having a substantially cylindrical shape, and is a structure in which an inner cylinder is combined with an outer cylinder. The bearing 18 is attached between the outer peripheral face of this inner cylinder and the inner peripheral face of the outer cylinder, and the rotor yoke 14a is attached to the outer peripheral face of the outer cylinder.

The rotary shaft 19 is a cylindrical member that serves as the rotational center of the rotor 14, and has a through-hole that passes from one end to the other in the axial direction. External splines 19a that mate with the internal teeth of the coupling 13 are formed at the end of the rotary shaft 19 on the engine 2 side, and internal splines 19b that mate with the input shaft on the hydraulic pump 4 side are formed at the end on the hydraulic pump 4 side. The rotary shaft 19 is fixed in a state in which the half on the hydraulic pump 4 side in the axial direction is inserted on the inner peripheral face side of the inner cylinder of the flange 16.

The second housing 15 is a cast iron member, and as shown in FIG. 3, is provided on the hydraulic pump 4 side of the generator motor 1, and along with the first housing 11 forms a holding spacing for holding the flywheel 12, the coupling 13, the rotor 14, the stator 10, and the rotary shaft 19. The second housing 15 has an oil cooler 15d for cooling the cooling oil. The outlet of the oil cooler 15d is connected to a cooling oil pipe 15a for sending cooling oil up to the upper part inside the first and second housings 11 and 15. A cooling water pipe 15b that guides cooling water from the engine 2 side is connected to the lower part of the second housing 15. An electrical box 17 connected to the wiring, etc., of the coils 23 wound around the protrusions of the stator core 20 via the insulator 21 is attached to the shoulder of the second housing 15 as shown in FIG. 4.

The cooling oil held in the oil pan V goes through a pipe (not shown), a filter (not shown), and a circulation pump (such as an electric pump) and is supplied to the inlet of the oil cooler 15d provided at the lower part of the second housing 15. The cooling oil pipe 15a connected to the outlet of the oil cooler 15d is connected to the upper part of the second housing 15 in order to supply cooling oil scooped up from the oil pan V to the upper part of the space formed inside the first and second housings 11 and 15.

As shown in FIG. 2, the cooling water pipe 15b is connected to the engine 2, and supplies cooling water, which serves as a cooling medium in the oil cooler 15d provided to the lower part of the generator motor 1, from the engine 2 to the oil cooler 15d.

This cooling water is cooled in a radiator, after which it is supplied to the engine 2. The cooling water branches off inside the engine 2 and is supplied through the cooling water pipe 15b to the oil cooler 15d. The cooling water supplied from the inlet side of the oil cooler 15d to the inside of the oil cooler 15d undergoes heat exchange with the cooling oil, after which it passes from the outlet side, through a cooling water return pipe 15c, and back to the engine 2, where it merges with the cooling water inside the engine 2, and is then sent back to the radiator, where it is cooled by heat exchange with air. The cooling water pipe 15b and the cooling water return pipe 15c are rubber hoses.

As shown in FIG. 3, the flange 16 is a disk-shaped member disposed coaxially with the rotary shaft 19, and in its interior is formed a cooling oil path 16a that guides to the desired portions the cooling oil sent through the cooling oil pipe 15a to the upper part of the second housing 15. The flange 16 is fixed by a plurality of bolts to the hydraulic pump 4 side of the second housing 15. The flange 16 has a substantially cylindrical bearing support 16e that protrudes in the axial direction from a substantially disk-shaped face. The bearing support 16e supports the bearing 18 on the substantially cylindrical outer peripheral face side.

The cooling oil path 16a supplies cooling oil that has flowed from the upper space inside the first and second housings 11 and 15, to the bearing 18, splines (joining components), and so forth in contact with the members on the stationary side and with the rotor 14 and the rotary shaft 19. Consequently, a sufficient quantity of lubricating oil (cooling oil) is supplied at all times to the bearing 18, splines (joining components), and so forth. Also, the oil that moves through the cooling oil path 16a functions as cooling oil that moves outward in the radial direction under the centrifugal force produced when the rotor 14 and other rotation-side members rotate, and is thus supplied to the coils 23 on the hydraulic pump 4 side to cool the coils 23. This oil lubricates and cools the splines on the engine 2 side through the through-hole inside the rotary shaft 19. After this, the oil moves outward in the radial direction under the centrifugal force produced when the rotor 14 and other rotation-side members rotate, and is used to cool the coils 23 provided on the coils 23 side.

Dipstick Tube 30

Figure 5:
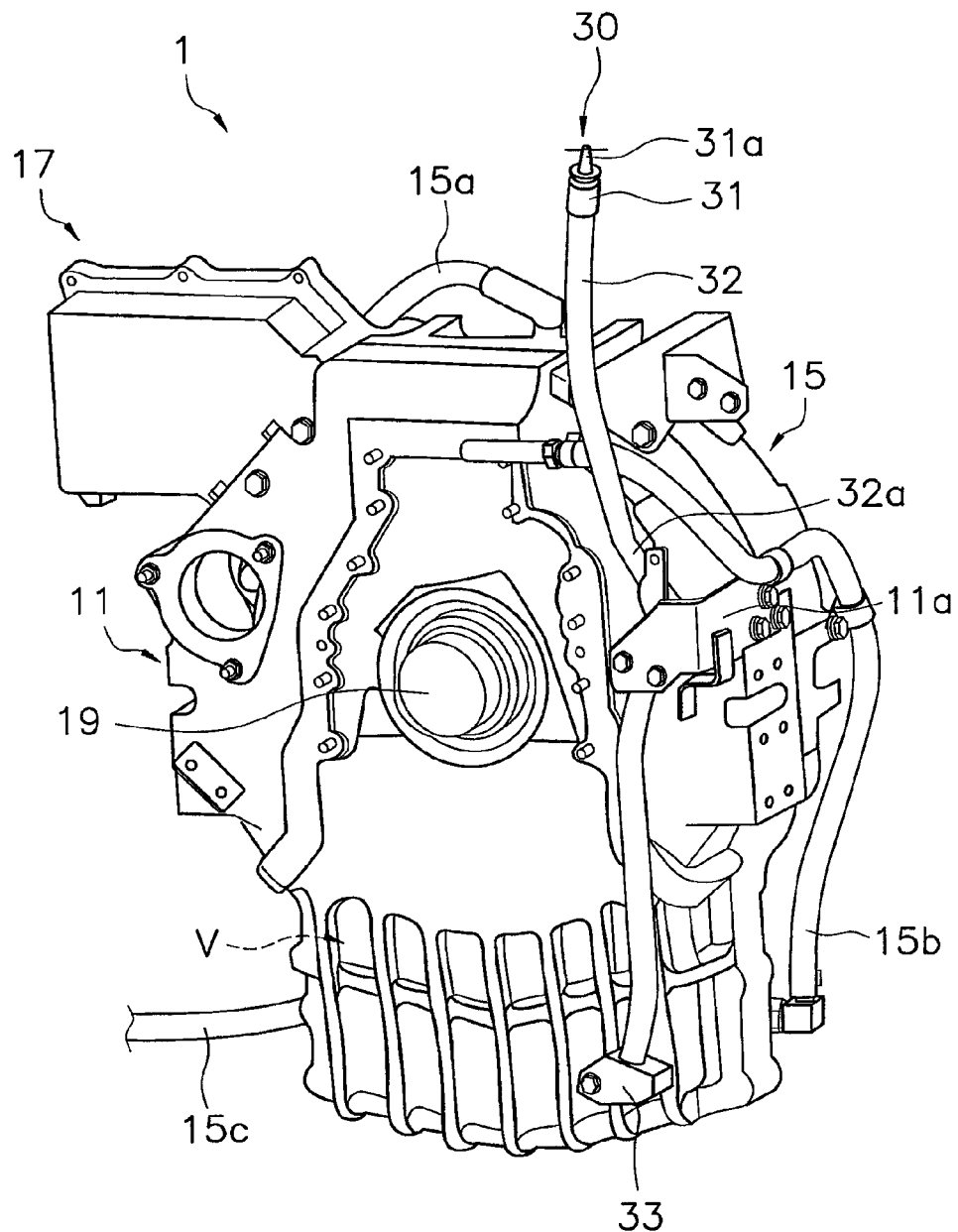
FIG. 5 is an oblique view of the generator motor included in FIG. 2.

As shown in FIG. 5, the generator motor 1 installed in the hybrid hydraulic excavator 51 in this embodiment is such that the dipstick tube 30 is connected to the lower part of the first housing 11 fixed on the engine 2 side, out of the first and second housings 11 and 15 that constitute the outer profile of the generator motor 1.

The dipstick tube 30 is provided in order to check the level of oil inside the oil pan V formed within the first and second housings 11 and 15. In this embodiment, the dipstick tube 30 is also used as an oil filler pipe for adding oil to the oil pan V. Consequently, fewer parts are needed and the configuration around the generator motor 1 is simpler than when the dipstick tube 30 and the oil filler pipe are provided separately.

Figure 6:
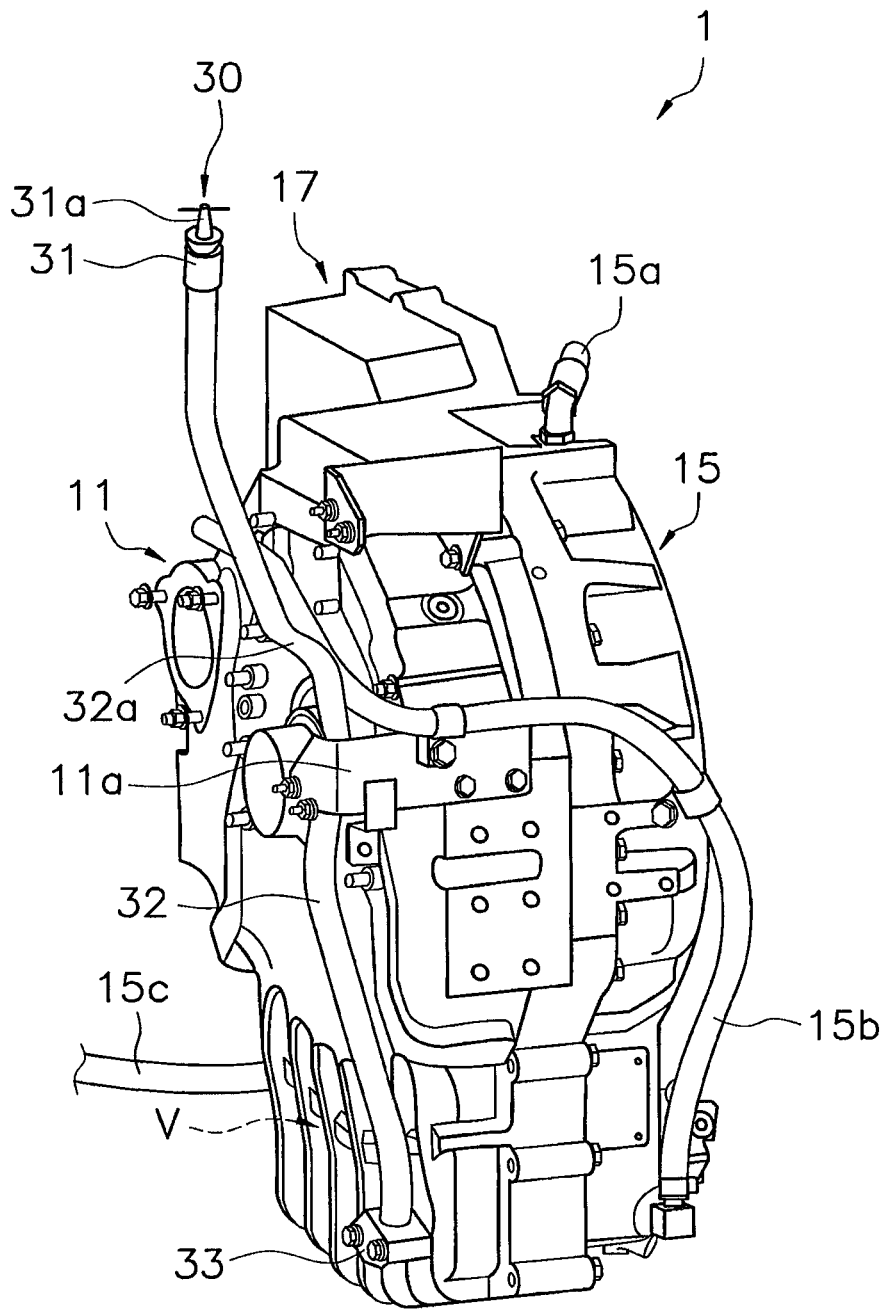
FIG. 6 is an oblique view of the generator motor included in FIG. 2.

As shown in FIGS. 5 and 6, the dipstick tube 30 also has a dipstick opening 31, a main body 32, and a connector 33. The dipstick tube 30 is routed to the upper opening 60a side of the engine compartment 60 that is exposed when the engine hood 64 is opened.

Figure 7:
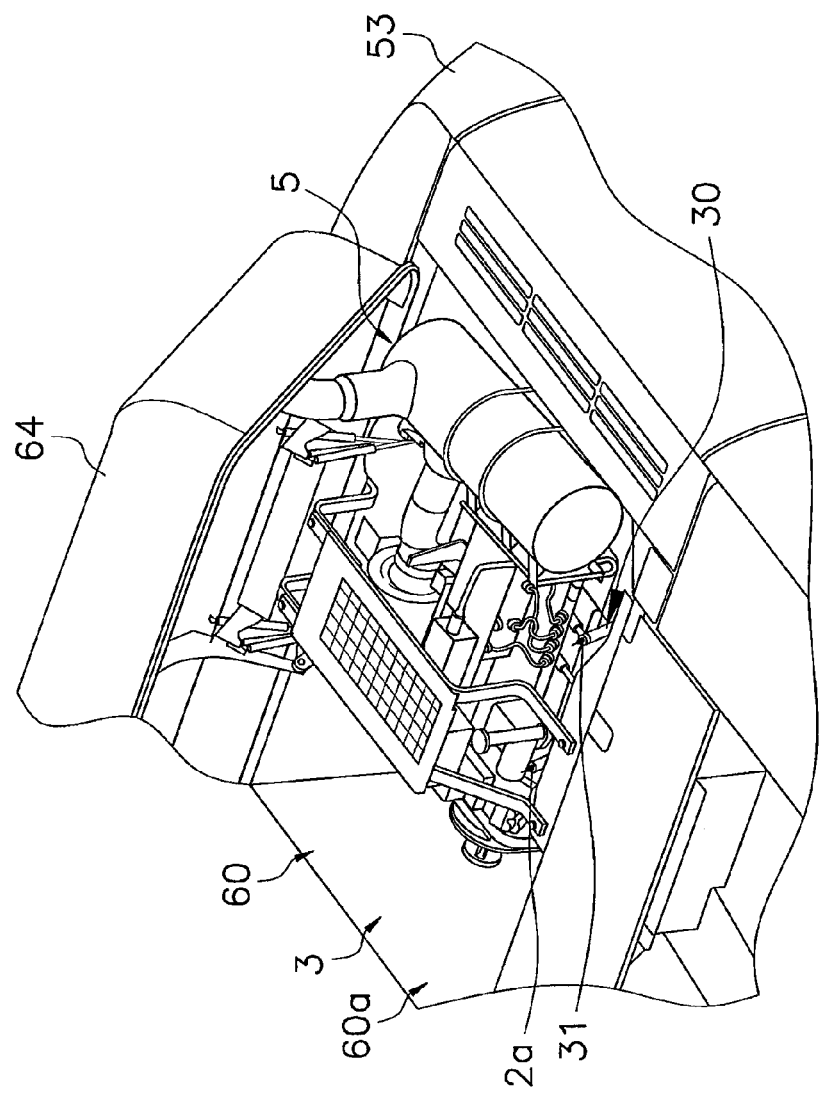
FIG. 7 is an oblique view of a state in which the engine hood of the hydraulic excavator in FIG. 1 has been opened.

The dipstick opening 31 is provided above the generator motor 1 with the main body 32 and the connector 33 in between. A dipstick 31a inserted into the distal end of the dipstick opening 31 is pulled out to check whether or not the oil held in the oil pan V formed inside the first and second housings 11 and 15 is at the proper level. Since the dipstick opening 31 is provided above the generator motor 1, as shown in FIG. 7, it is disposed at a location that is easily accessible when the engine hood 64 provided to the upper face of the machinery bay 56 of the revolving base 53 of the hybrid hydraulic excavator 51 has been opened. Consequently, when the engine hood 64 is opened and the oil level in the engine 2 is checked with the engine dipstick tube 2a, the oil level in the generator motor 1 can also be checked at the same time with the dipstick 31a inserted into the dipstick tube 30. This makes the work easier during inspection.

The engine dipstick tube 2a and the dipstick opening 31 of the generator motor 1 are preferably provided on the same side, as in this embodiment, rather than being disposed on separate sides such as at the front and rear or on the left and right of the vehicle, for example. This makes the work easier when checking the oil level in the engine 2 and the oil level in the generator motor 1.

As shown in FIG. 5, the main body 32 is a steel pipe that goes from the connector 33 to the dipstick opening 31. As shown in FIG. 6, the main body 32 has a bent section 32a that is bent in the direction of routing the dipstick opening 31 to the engine 2 side in a side view of the generator motor 1. The bent section 32a is provided in the approximate center of the main body 32, and the main body 32 is bent to the engine 2 side using a support member 11a provided to the first housing 11 as a base. Consequently, as shown in FIG. 2, the dipstick tube 30 is not provided near the muffler 5 provided near and directly over the generator motor 1. As a result, the dipstick tube 30 is not affected by the heat from the muffler 5. Also, the dipstick opening 31 can be provided away from the muffler 5, so a worker will not be affected by heat from the muffler 5 when checking the oil level, topping up the oil, or performing other such inspection work.

The connector 33 is attached to the lower part of the first housing 11 fixed on the engine 2 side of the generator motor 1, and communicates with the oil pan V formed in the generator motor 1. Consequently, when the generator motor 1 is taken apart, for example, the second housing 15 will remain fixed on the engine 2 side even at the final stage, so there is no need to remove the dipstick tube 30.

Features

As shown in FIG. 2, the hydraulic excavator 51 in this embodiment is equipped with the generator motor 1, which is provided between the engine 2 and the hydraulic pump 4 and in the interior of which is formed the oil pan V, and is also equipped with the dipstick tube 30, which has the connector 33 that communicates with the oil pan V of the generator motor 1, and the dipstick opening 31 disposed above the generator motor 1.

Consequently, as shown in FIG. 7, maintenance of the engine 2 and maintenance of the generator motor 1 can both be performed in a state in which the engine hood 64 has been opened on the upper face of the machinery bay 56 of the revolving base 53 of the hybrid hydraulic excavator 51. As a result, the maintenance work on the hybrid hydraulic excavator 51 can be performed more easily than in the past.

Furthermore, unlike with a conventional structure in which the dipstick opening is provided on the hydraulic pump side with an attachment seat or the like in between, when the hydraulic pump is removed, the problem of the portion on the side of the hydraulic pump 4 with the larger cross sectional area (the generator motor 1 side) coming into contact with part of the dipstick tube 30 and causing damage, for example, can be avoided.

Other Embodiments

An embodiment of the present invention was described above, but the present invention is not limited to or by the above embodiment, and various modifications are possible without departing from the gist of the invention.

(A) In the embodiment, an example was given in which the connector 33 of the dipstick tube 30 was provided to the first housing 11 fixed on the engine 2 side of the generator motor 1. However, the present invention is not limited to this.

For example, the connector of the dipstick tube may be provided to the second housing on the hydraulic pump side.

Here again, maintenance of the engine and the generator motor can be carried out together in a state in which the engine hood has been opened on the upper face of the machinery bay of the revolving base, which affords the same effect as above, namely, that the work is easier.

However, in terms of not having to remove the dipstick tube even at the final stage in the disassembly of the generator motor, it is preferable to provide the connector of the dipstick tube to the first housing on the engine side.

(B) In the embodiment, an example was given in which the present invention was applied to a hybrid hydraulic excavator. However, the present invention is not limited to this.

For example, the present invention can be similarly applied to another hybrid construction machine, such as a wheel loader, a bulldozer, or a dumper truck.

(C) In the embodiment, an example was given in which the engine 2, the generator motor 1, and the hydraulic pump 4 were disposed serially in that order. However, the present invention is not limited to this.

For example, the generator motor may be linked directly to a PTO (power takeoff).

(D) In the embodiment, an example was given in which an SR (switched reluctance) motor was used as the generator motor 1, but the present invention is not limited to this.

For example, a PM (Permanent Magnet) motor or other such generator motor may be used.

Because the construction machine of the illustrated embodiment has the effect of allowing maintenance work to be carried out more easily than in the past, it can be widely applied to hybrid construction machines in which a generator motor is installed between the engine and a hydraulic pump.

The invention claimed is:

1. A construction machine comprising:
   an engine;
   a hydraulic pump driven by drive force of the engine;
   a generator motor disposed between the engine and the hydraulic pump and having a rotary shaft connected to an input shaft of the hydraulic pump and to an output shaft of the engine, and an oil pan disposed in a lower part of a holding space formed inside a housing;
   a dipstick tube for the generator motor having a connector provided at a location that communicates with the oil pan of the generator motor, and a dipstick opening disposed above the generator motor, for checking a level of oil in the oil pan; and
   an engine dipstick tube for checking the oil level of the engine.

2. The construction machine according to claim 1, further comprising
   an engine hood configured and arranged to be opened and closed, and covering an upper space in an engine compartment that houses the engine, the hydraulic pump, and the generator motor, wherein
   the dipstick opening of the dipstick tube is provided in a space that is exposed when the engine hood is opened.

3. The construction machine according to claim 1, wherein the dipstick opening of the dipstick tube for the generator motor is provided on the same side as a dipstick opening of the engine dipstick tube.

4. The construction machine according to claim 1, wherein the housing includes a first housing fixed on an engine side, and a second housing fixed on a hydraulic pump side, and the connector is provided to the first housing.

5. The construction machine according to claim 1, wherein the dipstick tube is further configured and arranged to be used as an oil filler pipe for adding oil to the generator motor.

6. The construction machine according to claim 1, wherein the dipstick tube has a bent section that bends away from a muffler mounted on the engine.

7. The construction machine according to claim 1, wherein the construction machine is a hydraulic excavator.

* * * * *